United States Patent
Mathew et al.

(10) Patent No.: US 9,262,256 B2
(45) Date of Patent: Feb. 16, 2016

(54) USING DARK BITS TO REDUCE PHYSICAL UNCLONABLE FUNCTION (PUF) ERROR RATE WITHOUT STORING DARK BITS LOCATION

(71) Applicants: Sanu K. Mathew, Hillsboro, OR (US); Sudhir K. Satpathy, Hillsboro, OR (US); Patrick Koeberl, Alsbach-Haenlein (DE); Jiangtao Li, Beaverton, OR (US); Ram K. Krishnamurthy, Portland, OR (US); Anand Rajan, Beaverton, OR (US)

(72) Inventors: Sanu K. Mathew, Hillsboro, OR (US); Sudhir K. Satpathy, Hillsboro, OR (US); Patrick Koeberl, Alsbach-Haenlein (DE); Jiangtao Li, Beaverton, OR (US); Ram K. Krishnamurthy, Portland, OR (US); Anand Rajan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 14/140,243

(22) Filed: Dec. 24, 2013

(65) Prior Publication Data
US 2015/0178143 A1 Jun. 25, 2015

(51) Int. Cl.
*G06F 21/00* (2013.01)
*H04L 29/06* (2006.01)
*G06F 11/07* (2006.01)
*G11C 7/24* (2006.01)
*G11C 7/00* (2006.01)
*G06F 7/58* (2006.01)
*H04L 9/34* (2006.01)

(52) U.S. Cl.
CPC ........ *G06F 11/0793* (2013.01); *G06F 11/0745* (2013.01); *G11C 7/24* (2013.01); *H04L 9/34* (2013.01)

(58) Field of Classification Search
CPC ... G06F 11/0793; G06F 11/0745; G11C 7/24; H04L 9/34
See application file for complete search history.

(56) References Cited

U.S. PATENT DOCUMENTS

2013/0194886 A1* 8/2013 Schrijen et al. ............... 365/226
2015/0092939 A1* 4/2015 Gotze et al. ...................... 380/2

FOREIGN PATENT DOCUMENTS

WO    WO 2015026838 A1 *  2/2015  .............. H04L 63/08

OTHER PUBLICATIONS

Satpathy, S.; Mathew, S.; Jiangtao Li; Koeberl, P.; Anders, M.; Kaul, H.; Chen, G.; Agarwal, A.; Hsu, S.; Krishnamurthy, R.; "13fJ/bit probing-resilient 250K PUF array with soft darkbit masking for 1.94% bit-error in 22nm tri-gate CMOS"; European Solid State Circuits Conference (ESSCIRC), Year: Aug. 2014; pp. 239-242.*

* cited by examiner

*Primary Examiner* — Amir Mehrmanesh
*Assistant Examiner* — Courtney Fields
(74) *Attorney, Agent, or Firm* — Lowenstein Sandler LLP

(57) ABSTRACT

Dark-bit masking technologies for physically unclonable function (PUF) components are described. A computing system includes a processor core and a secure key manager component coupled to the processor core. The secure key manager includes the PUF component, and a dark-bit masking circuit coupled to the PUF component. The dark-bit masking circuit is to measure a PUF value of the PUF component multiple times during a dark-bit window to detect whether the PUF value of the PUF component is a dark bit. The dark bit indicates that the PUF value of the PUF component is unstable during the dark-bit window. The dark-bit masking circuit is to output the PUF value as an output PUF bit of the PUF component when the PUF value is not the dark bit and set the output PUF bit to be a specified value when the PUF value of the PUF component is the dark bit.

22 Claims, 13 Drawing Sheets

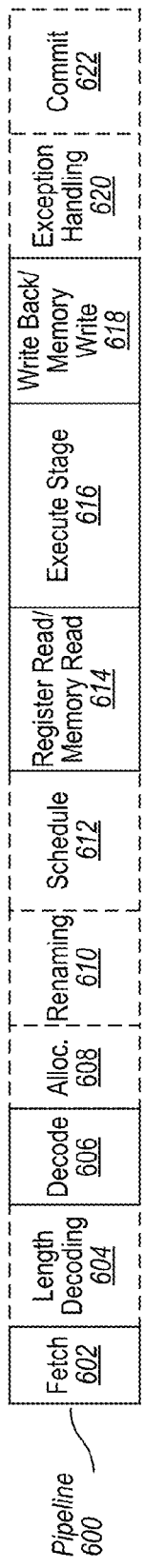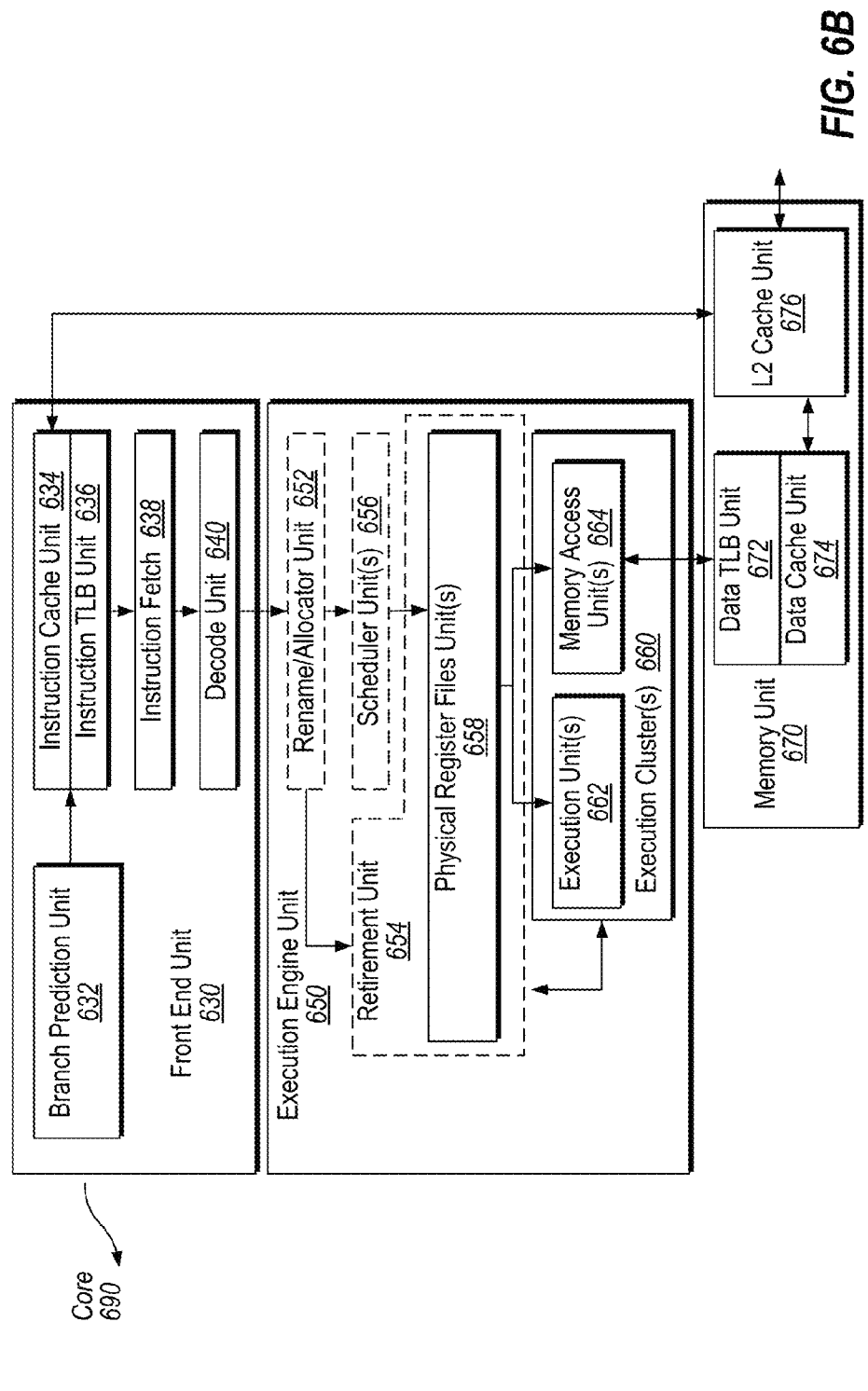

USING DARK BITS TO REDUCE PHYSICAL UNCLONABLE FUNCTION (PUF) ERROR RATE WITHOUT STORING DARK BITS LOCATION

Embodiments described herein generally relate to processing devices and, more specifically, relate to reducing physical unclonable function (PUF) error rates.

BACKGROUND

During manufacture, keys can be provisioned to and stored in an integrated circuit or processor. The keys may be stored in fuses of the integrated circuits or processors and may be unique per type of integrated circuit or processor. The keys may be fed into and consumed by various security engines or co-processors. Keys may be stored in non-volatile memory having a special type of security fuses. Security fuses may have a number of security countermeasures in place that make them less susceptible than regular fuses to physical attacks. However, these security countermeasures make the security fuses more costly, in terms of die area, than regular fuses such as general-purpose high-density fuses.

BRIEF DESCRIPTION OF THE DRAWINGS

FIG. 6A is a block diagram illustrating an in-order pipeline and a register renaming stage, out-of-order issue/execution pipeline according to one embodiment.

FIG. 6B is a block diagram illustrating a micro-architecture for a processor that implements dynamic heterogeneous hashing according to one embodiment.

DESCRIPTION OF EMBODIMENTS

Dark-bit masking technologies for physically unclonable function (PUF) components are described. A computing system includes a processor core and a secure key manager component coupled to the processor core. The secure key manager includes the PUF component, and a dark-bit masking circuit coupled to the PUF component. The dark-bit masking circuit is to measure a PUF value of the PUF component multiple times during a dark-bit window to detect whether the PUF value of the PUF component is a dark bit. The dark bit indicates that the PUF value of the PUF component is unstable during the dark-bit window. The dark-bit masking circuit is to output the PUF value as an output PUF bit of the PUF component when the PUF value is not the dark bit, and to set the output PUF bit to be a specified value when the PUF value of the PUF component is the dark bit. That is, the dark-bit masking circuit makes the output PUF bit be the specified value when found to be a dark bit.

PUF is a useful hardware security primitive with many potential applications, such as secure key generation and storage, device anti-counterfeiting, IP protection, hardware/software binding, etc. In some contexts, a vertical IP block that uses PUF as underlying static entropy can be used for three typical usages: secure key generation, fuse encryption, and trusted origins. Since PUF is noisy due to the construction, PUF response may need to be post-processed in order to convert them into high-quality cryptographic keys. Higher PUF noise rate may require higher complexity of error correction, resulting in higher expenses. It is important to reduce the PUF error rate as much as possible in various applications.

In some embodiments described herein, a method to reduce PUF error rate uses dark bits. Dark bits indicate that the PUF value of the PUF component is unstable. In conventional approaches, locations of these identified dark bits are stored in non-volatile memory (NVM) of the device. The embodiments described herein, unlike the conventional approaches, do not need to store the locations of the dark bits in the NVM of the device. Fuses that are used to store dark bits can be expensive and can be roughly four times larger than a PUF component (also referred to as a PUF cell). Not storing the dark bits in the NVM can provide significant savings. As described herein, the PUF error rate can be reduced from approximately five percent to approximately one percent using the embodiment described herein without requiring additional fuses for storing the dark bits mask.

Figure 1:
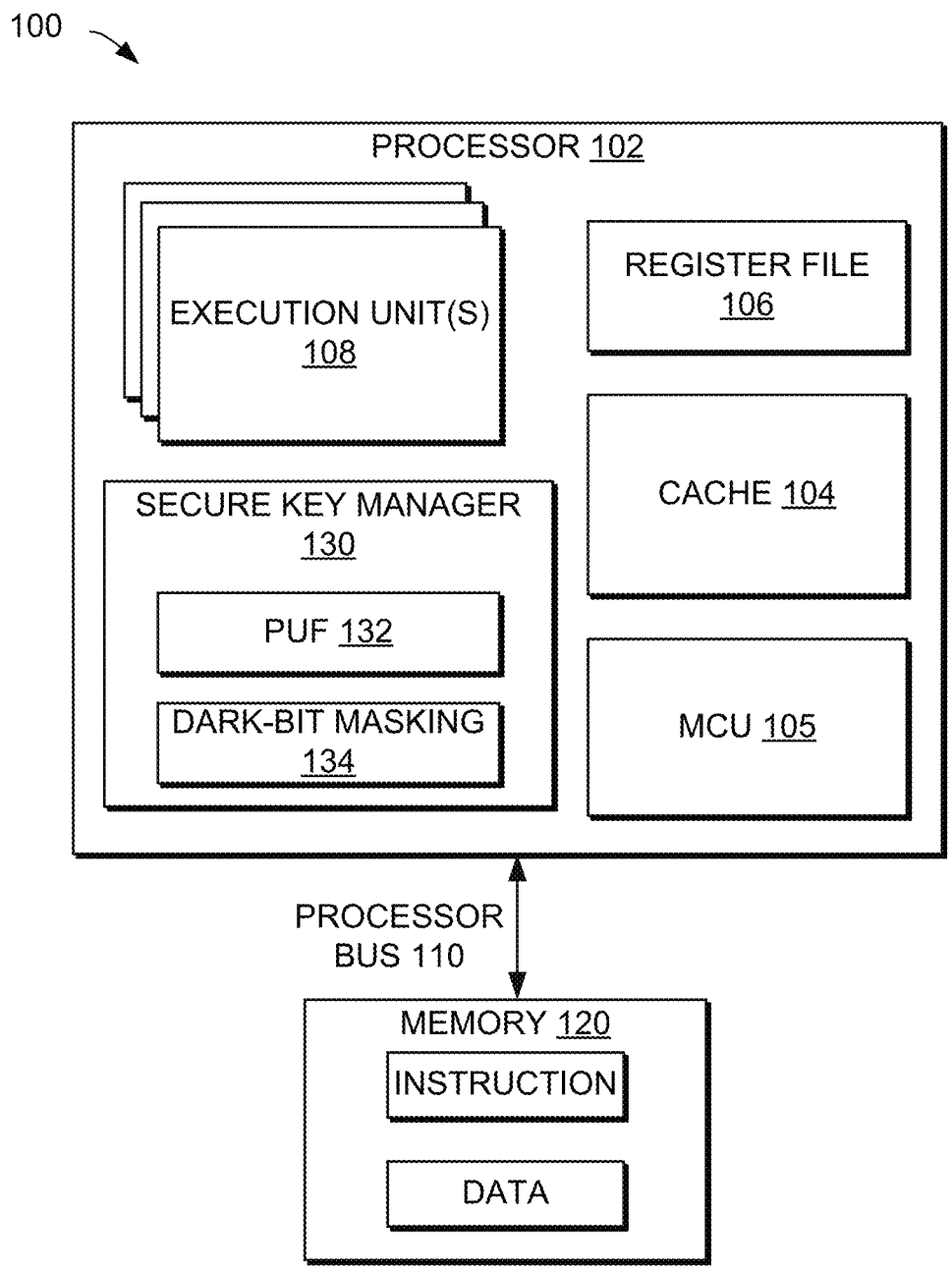
FIG. 1 is a block diagram of a computing system that implements a dark-bit masking block for a processor according to one embodiment.

FIG. 1 is a block diagram of a computing system 100 that implements a dark-bit masking block 134 for a processor 102 according to one embodiment. The computing system 100 is formed with a processor 102 that includes one or more execution units 108 to execute an instruction and the dark-bit masking block 134 that implements one or more features in accordance with one or more embodiments as described herein. In short, the dark-bit masking block 134 operates to identify dark bits in PUF components 132 and set these dark bits to be a specified value (i.e., set or make the output to be the specified value). In one embodiment, a secure key manager component 130 is coupled to the execution unit 108 and the secure key manager 130 includes a PUF components 132 and the dark-bit masking block 134 coupled to the PUF component 132. The dark-bit masking block 134 is to measure a PUF value of the PUF component 132 multiple times during a dark-bit window to detect whether the PUF value of the PUF component 134 is a dark bit. The dark bit indicates that the PUF value of the PUF component 132 is unstable during the dark-bit window. The dark-bit masking block 134 outputs the PUF value as an output PUF bit of the PUF component 134 when the PUF value is not the dark bit and set the output PUF bit to be a specified value when the PUF value of the PUF component 132 is the dark bit. In one embodiment, the dark-bit masking block 134 is a dark-bit masking circuit, as described herein. In another embodiment, the dark-bit masking block 134 can be implemented in microcode, firmware, software, other software processing logic, or any combination thereof. Additional details regarding the dark-bit masking block 134 are described in more detail below with respect to FIGS. 2-5.

Computing system 100 includes a component, such as a processor 102 to employ execution units 108 including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, a I/O controller, etc. These elements perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, configuration registers, and instruction pointer register.

Execution unit 108, including logic to perform integer and floating point operations, also resides in the processor 102. It should be noted that the execution unit may or may not have a floating point unit. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102. The processor 102 is coupled to the memory 120 via a processor bus 110. A system logic chip, such as a memory controller hub (MCH) may be coupled to the processor bus 110 and memory 120. An MCH can provide a high bandwidth memory path to memory 120 for instruction and data storage and for storage of graphics commands, data and textures. The MCH can be used to direct data signals between the processor 102, memory 120, and other components in the system 100 and to bridge the data signals between processor bus 110, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the MCU 105 can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Each time the PUF is used for applications like secure key generation, a PUF output can be measured multiple times, even hundreds of times. If certain PUF bits are noisy, these bits can be treated as dark bits and can be replaced with a '1' (one) or '0' (zero). The PUF response, after all dark bits have been replaced with '1' (or '0'), results in up to eighty percent (80%) reduction in error rate. This can reduce the size of ECC fuses used to correct noisy bits, leading to significant area over BKM techniques. In one approach that uses dark bits, the PUF value is measured multiple times during manufacturing time. If a PUF bit is not stable, the bit is marked as a dark bit. The location of the dark bits (called dark bits mask) is stored externally such as the NVM of the device. In the evaluation phase, the PUF is evaluated once. The dark bits in the PUF response are discarded based on the dark bits mask, since these bits were noisy during the manufacturing time. The dark bits method is an effective way to reduce the PUF error rate. Academically, the external storage is free for PUF applications and it is expensive to measure PUF multiple times in the evaluation phase (in the literature dark bits are used in conjunction with SRAM PUFs must be power-cycled to re-read the PUF response).

However, in practice, NVM of device (fuses) can be very expensive and the PUF value can be measured on some processors at very high speeds, such as reading or evaluate each PUF cell in one clock. In some cases, the processor can measure the PUF cell two hundred times in a very reasonable amount of time. The embodiments described herein can take advantage that the PUF value can be evaluated multiple times quickly and reduces the fuse consumption. Here is a concrete comparison of a traditional dark bit scheme and our invention. Assuming that a raw PUF error rate is 5% with min-entropy 95%, the embodiments describe herein can reduce the error rate to 1%. The number of dark bits is less than 11% of total PUF bits. Assume that the traditional dark bits method can reduce the error rate to 0.5%. The goal is to generate 256-bit key from PUF using fuzzy extractor. The following table shows that, without using dark bits, 3.5 k PUF and 3 k fuses are needed. Using traditional dark bits method, 0.9 k PUF and 1.1 k fuses are needed. Using the embodiments described herein (labeled "new method"), about 1 k PUF and only less than 0.4 k fuses are needed. Since fuses are more expensive than PUF (at least ~4× larger in area), the embodiments described herein can provide a significant savings.

| Method | Error Rate | Entropy | BCH Code | PUF size | Fuse Size |
|---|---|---|---|---|---|
| Dark Bits not Used | 5% | 95% | [507, 99, 61] | 3549 | 2856 |
| New method | 1% | 95% | [478, 280, 23] | 956 | 396 |
| Traditional dark bit method | 0.5% | 95% | [422, 278, 17] | 844 | 1132 |

Figure 2:
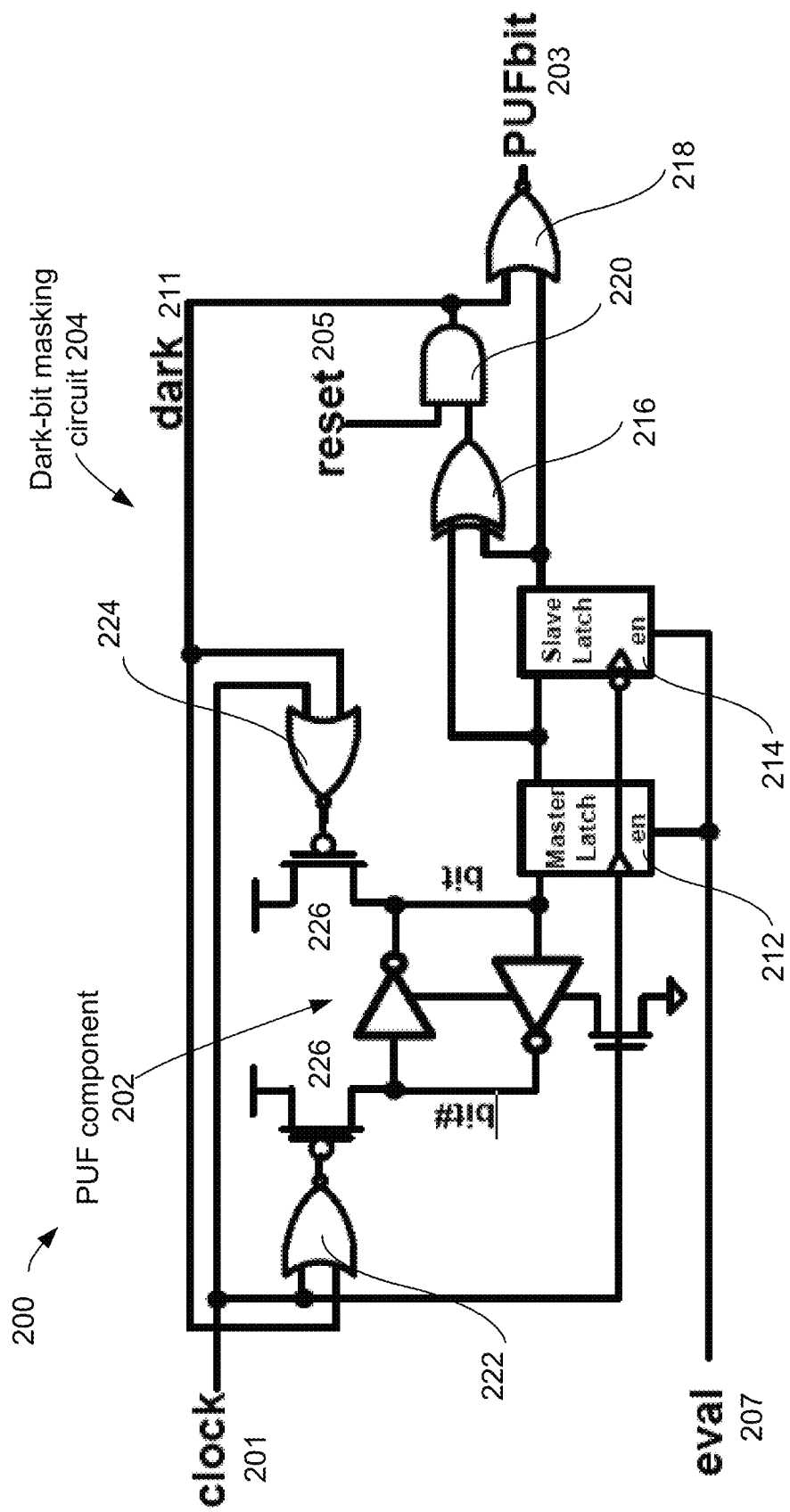
FIG. 2 is a block diagram of a circuit including a PUF component and a dark-bit masking circuit with dark-bit masking to zero according to one embodiment.
Figure 3:
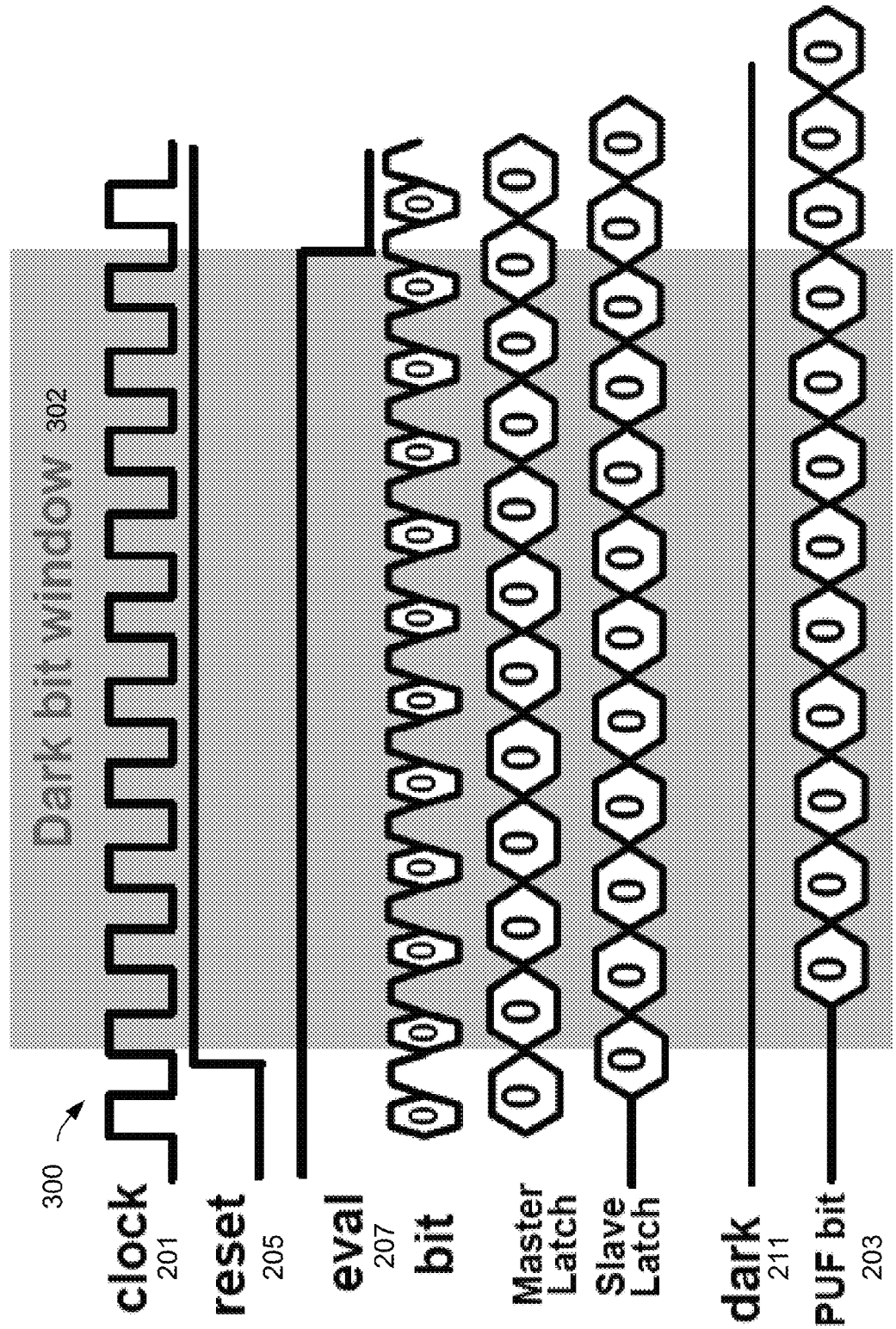
FIG. 3 is a waveform diagram of a dark-bit window where the PUF value is not a dark bit according to one embodiment.

FIG. 2 is a block diagram of a circuit 200 including a PUF component 202 and a dark-bit masking circuit 204 with dark-bit masking to zero according to one embodiment. In this embodiment, the PUF components 202 is a cross-coupled inverter pair that is pushed into an unstable state by precharging both inventors nodes to '1' when clock is zero (clock=0). During the evaluation phase, the cross-coupled resolves out of metastability based on device mismatches in the inverters and delay variations in the clocked NOR gates 222, 224, and precharge transistors 226. The output of the PUF component 202 is captured using master latch 212 and slave latches 214. In the case of a stable zero ('0') PUF value, the output 'bit' will go to '0' during every evaluation cycle, and therefore both master and slave latches 212, 214 will store the same value. An XOR gate 216 is used to compare these latch values and produce a 'dark' signal 211, which will remain low (0) in this case, as illustrated in FIG. 3. The operation is very similar for a stable '1' PUF.

FIG. 3 is a waveform diagram 300 of a dark-bit window 302 where the PUF value 304 is not a dark bit according to one embodiment. The dark-bit window 302 is started by a reset signal 301 into an AND gate 220 of dark-bit masking circuit 204. At the end of the dark-bit window 302, the reset signal 301 is turned off (set to zero) and the evaluation signal is turned off (set to zero).

Figure 4:
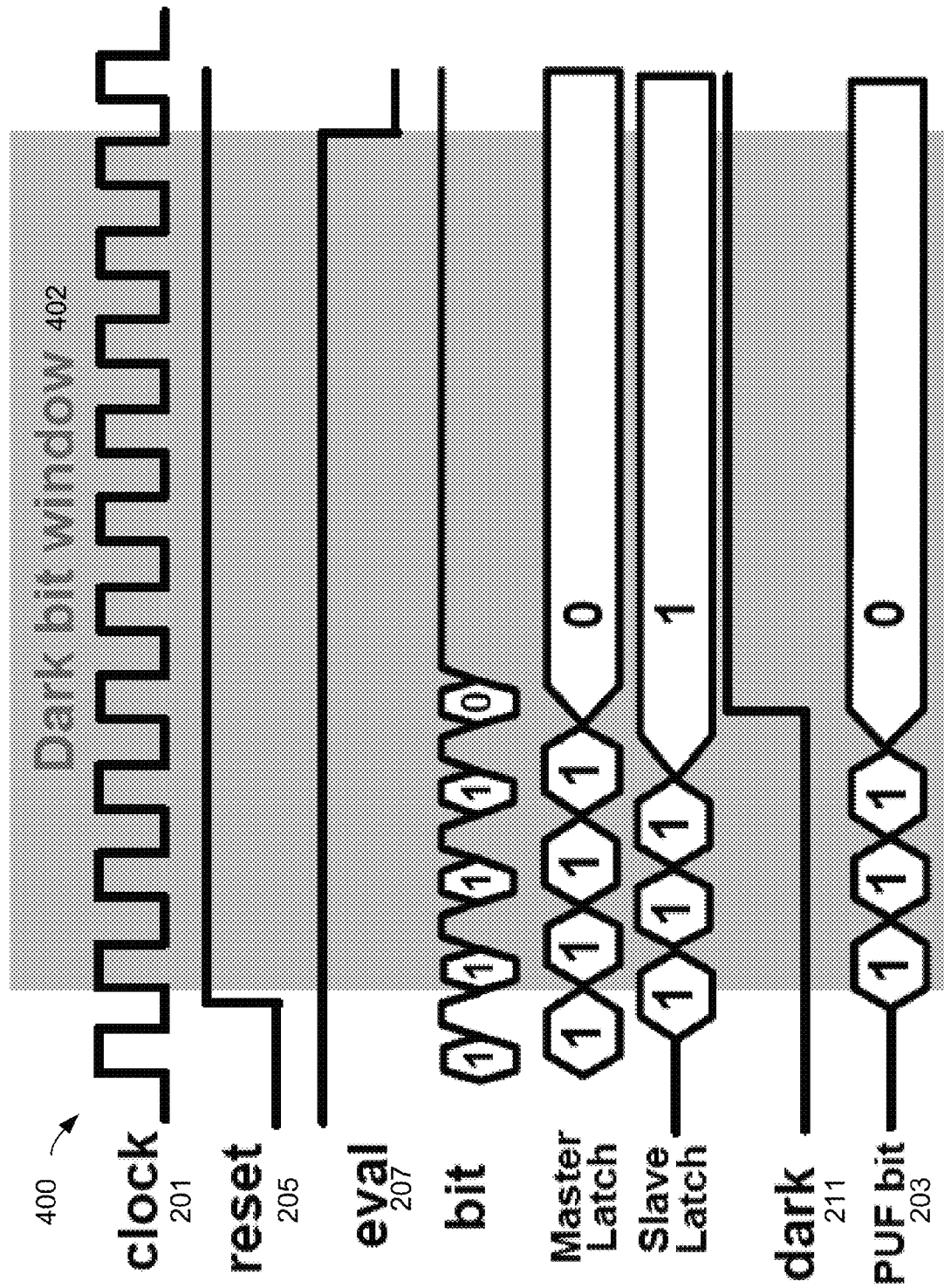
FIG. 4 is a waveform diagram of a dark-bit window where the PUF value is a dark bit according to one embodiment.

FIG. 4 is a waveform diagram 400 of a dark-bit window 402 where the PUF value 203 is a dark bit according to one embodiment. The dark-bit window 402 is started by a reset signal 205 into an AND gate 220 of dark-bit masking circuit 204. At the end of the dark-bit window 402, the reset signal 205 is turned off (set to zero) and an evaluation signal 207 is turned off (set to zero).

During operation of the circuit 200 there may be cases where the PUF value changes during the dark-bit window, and thus is an unstable PUF bit. At the point when the PUF value changes, the values of master and slave latches 212, 214 will be at complementary logic values, as illustrated in FIG. 4, where the unstable PUF component evaluates to 1 for the first 3 cycles, and thereafter switches state in the fourth cycle. At this point the master latch 212 gets updated with the new value '0', whereas the slave latch 214 holds the value '1' from the previous cycle. The XOR gate 216 detects this change in value and asserts the 'dark' signal 211. The dark signal 211 is fed back into the clock path to gate a clock signal 201 to the PUF component 202 and forces a PUF output bit 203 to '0'. The PUF output bit 203 is an output of a NOR gate 218 coupled to receive an output of an AND gate 220 and the output of the slave latch 214. The AND gate 220 receives the reset signal 205 and an output of the XOR gate 216.

Figure 5:
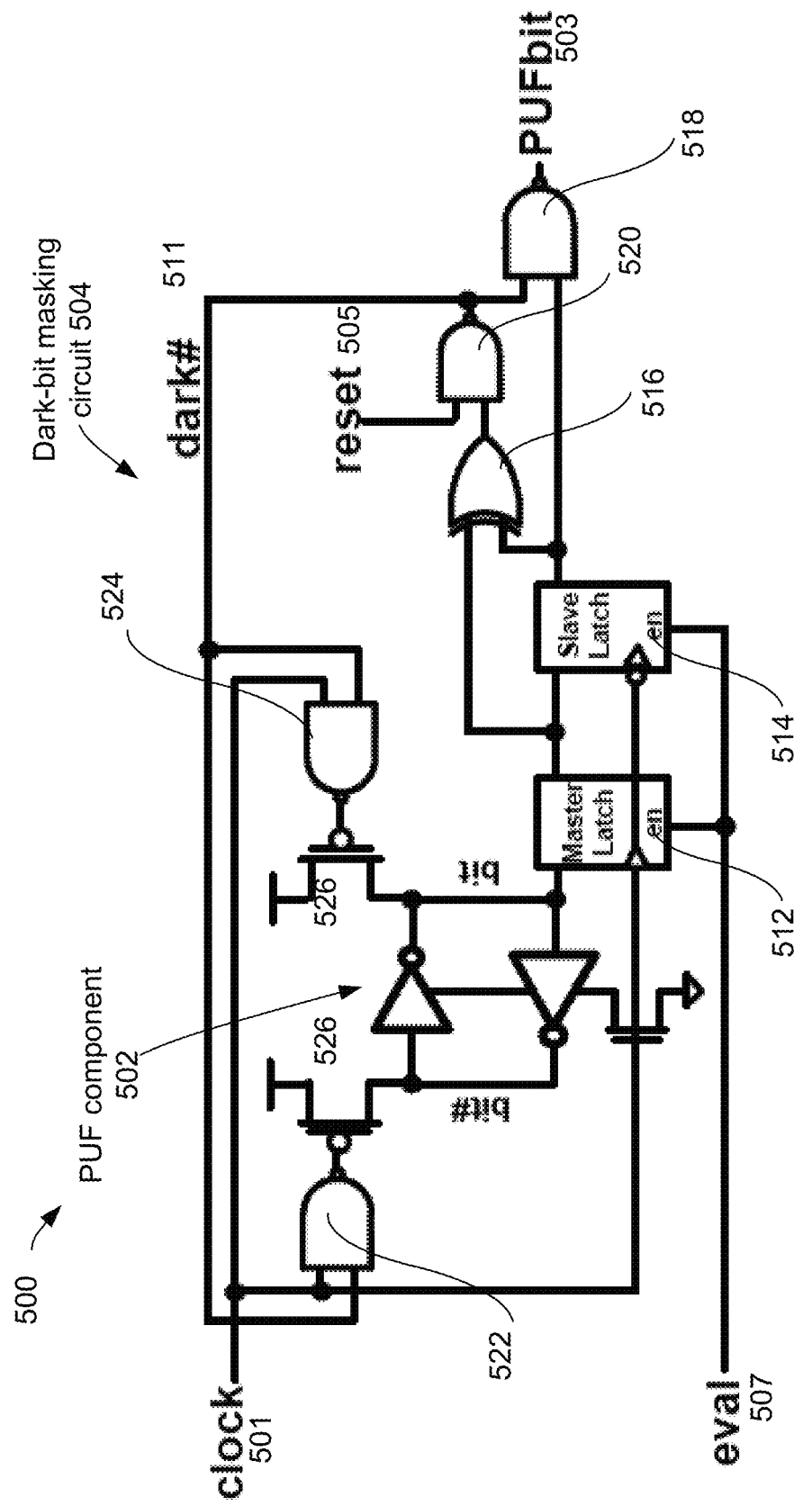
FIG. 5 is a block diagram of a circuit including a PUF component and a dark-bit masking circuit with dark-bit masking to one according to one embodiment.

The dark-bit masking circuit can also be modified to allow dark bits to be forced to '1', as illustrated in FIG. 5. By mixing both types of circuits, dark bits at even locations can be forced to '0' and odd locations can be forced to '1', for example. This may enable masking of dark bits without impacting overall PUF entropy, since on average, 50% of the dark bits will be forced to '0' and the rest to '1'. In one embodiment, the reset signal 205 is delayed by at least one cycle to allow both master and slave latches 212, 214 to initialize to the PUF value at the start of operation. The fall of the evaluation signal 207 ('eval' signal) signifies the end of the dark bit window 402.

FIG. 5 is a block diagram of a circuit including a PUF component 502 and a dark-bit masking circuit 504 with dark-bit masking to one according to one embodiment. In this embodiment, the PUF components 502 is a cross-coupled inverter pair that is pushed into an unstable state by precharging both inventors nodes to '1' when clock is zero (clock=0). During the evaluation phase, the cross-coupled resolves out of metastability based on device mismatches in the inverters and delay variations in the clocked NOR gates 522, 524, and precharge transistors 526. The output of the PUF component 502 is captured using master latch 512 and slave latches 514. In the case of a stable zero ('0') PUF value, the output 'bit' will go to '0' during every evaluation cycle, and therefore both master and slave latches 512, 514 will store the same value. An XOR gate 516 is used to compare these latch values and produce a 'dark' signal 511, which will remain high (1) in this case. The operation is very similar for a stable '1' PUF.

During operation of the circuit 500 there may be cases where the PUF value changes during the dark-bit window, and thus is an unstable PUF bit. At the point when the PUF value changes, the values of master and slave latches 512, 514 will be at complementary logic values, where the unstable PUF component evaluates to 1 for the first 3 cycles, and thereafter switches state in the fourth cycle. At this point the master latch 512 gets updated with the new value '0', whereas the slave latch 514 holds the value '1' from the previous cycle. The XOR gate 516 detects this change in value and asserts the 'dark' signal 511 (goes to low '0'). The dark signal 511 is fed back into the clock path to gate a clock signal 501 to the PUF component 502 and forces a PUF output bit 503 to '0'. The PUF output bit 503 is an output of a NAND gate 518 coupled to receive an output of an NAND gate 520 and the output of the slave latch 514. The NAND gate 520 receives the reset signal 505 and an output of the XOR gate 516.

In another embodiment, a processor includes a processor core and a secure key manager component that is coupled to the processor core. The secure key manager includes the PUF component and a dark-bit masking circuit coupled to the PUF component. The dark-bit masking circuit is to measure a PUF value of the PUF component multiple times during a dark-bit window to detect whether the PUF value of the PUF component is a dark bit. The dark bit indicates that the PUF value of the PUF component is unstable during the dark-bit window. The dark-bit masking circuit is also to output the PUF value as an output PUF bit of the PUF component when the PUF value is not the dark bit and force the output PUF bit to a specified value when the PUF value of the PUF component is the dark bit. In another embodiment, the PUF component includes a cross-coupled inverter pair to output the PUF value, such as illustrated in FIGS. 2 and 5. In other embodiments, the PUF components include other types of PUF circuits. For example, an arbiter PUF can be used. An arbiter PUF may include a number of four-terminal switching elements connected in series. These pass a signal through or switch it to the other output terminal based on a configuration bit. The challenge consists of a vector of configuration bits which are applied to the switch elements, resulting in a challenge space which is exponential in the number of challenge bits. A race condition is set up in the circuit by injecting a rising edge, and the faster propagation path determined by a terminating arbiter. This results in a single bit response for a particular challenge which can be scaled up to a multi-byte response vector by duplicating the circuit or challenging the circuit multiple times. For another example, a ring oscillator PUF can be used. The ring oscillator is a self oscillating delay loop commonly constructed from inverters. In the ring oscillator PUF, the frequencies of logically identical ring oscillators are compared to produce a single response bit. The operating frequency of the ring oscillators will be influenced by manufacturing variation and the frequency difference between two oscillators can be measured using a counter. A single response bit can thus be generated for a pair of oscillators. The ring oscillator PUF can be viewed as having a single challenge. Alternatively, other type PUF circuits may be used.

In one embodiment, the dark-bit masking circuit includes bit-transition logic to detect a transition in the PUF value during the dark-bit window and to output a dark signal in response to the detected transition, and clock-gating logic to gate a clock signal to the PUF component in response to the dark signal. In another embodiment, the dark-bit masking circuit includes a master latch coupled to an output of the PUF component, a slave latch coupled to the output of the master latch, and an XOR gate coupled to receive an output of the master latch and an output of the slave latch. In a further embodiment, the dark-bit masking circuit further includes an AND gate coupled to receive an output of the XOR gate, and a first NOR gate coupled to receive an output of the AND gate and the output of the slave latch. In a further embodiment, the dark-bit masking circuit further includes a second NOR gate coupled to receive an output of the AND gate and a clock signal and a third NOR gate coupled to receive the output of the AND gate and the clock signal. As illustrated, in FIGS. 2 and 5, the PUF component can be a cross-coupled inverter pair coupled to receive an output of the second NOR gate and an output of the third NOR gate.

In another embodiment, the dark-bit masking circuit further includes a first NAND gate coupled to receive an output of the XOR gate, and a second NAND gate coupled to receive an output of the first AND gate and the output of the slave latch. In a further embodiment, the dark-bit masking circuit further includes a third NAND gate coupled to receive an output of the first AND gate and a clock signal, and a fourth NAND gate coupled to receive the output of the first AND gate and the clock signal, wherein the PUF component comprises a cross-coupled inverter pair coupled to receive an output of the third NAND gate and an output of the fourth NAND gate.

In another embodiment, an integrated circuit includes a processor core and multiple PUF components to generate a hardware key, each of the PUF components outputting a PUF bit of the hardware key. A dark-bit masking circuit coupled to the PUF components determines unstable bits in the PUF bits of the hardware key and to forces the unstable bits to specified values. The dark-bit masking circuit may include bit-transition logic to detect a transition in the PUF value during the dark-bit window and to output a dark signal in response to the detected transition, and clock-gating logic to gate a clock signal to the PUF component in response to the dark signal. The dark-bit masking circuit may include other circuits as described herein.

As described herein, the dark-bit masking logic can be implemented as circuitry. In another embodiment, the dark-bit masking logic can be implemented by a processing core of the processor, such as microcode, firmware, software, or the like.

In one embodiment, a soft dark bit method (where the dark bits are not stored in NVM) can be implemented in architecture level in software, firmware, or a separate piece of hardware (instead of in circuit level). For example, in one embodiment, the following describes a dark-bit processing algorithm (with dark bit masking to 1):

---

Dark-bit Processing Algorithm (with dark-bit masking to 1)
Input: n PUF measurement w1, w2, ..., wn
Output: a stable PUF response w
Steps:
1. Let V be bitwise OR operation and $\oplus$ be bitwise XOR operation.
2. Compute w = w1 V (w1 $\oplus$ w2) V ... V (w1 $\oplus$ wn).
3. Output w.

---

It should be noted that this algorithm can be run in parallel with PUF measurements, instead of waiting for all PUF measurements to complete. To replace dark bits with '0' instead of '1', the following dark-bit processing algorithm can be changed as follows:

---

Dark Bit Processing Algorithm (with dark bit masking to 0)
Input: n PUF measurement w1, w2, ..., wn
Output: a stable PUF response w
Steps:
1. Compute m = (w1 $\oplus$ w2) V ... V (w1 $\oplus$ wn).
2. Compute w = w1 $\wedge$ (~m), where $\wedge$ is bitwise AND, ~ is bitwise inversion.

---

In some cases, the PUF component is evaluated 100 times and the dark bit mask is generated by catching bits that change value anytime within the dark bit window. Dark bit evaluation is done both at 0.7V and 0.9V to catch bits that shift value with voltage variation. Note that the dark bit mask generation may be embedded into the PUF circuit itself as shown in FIG. 2 and FIG. 5. The number of dark bits that are caught may vary with the width of the dark bit window. For example, in one embodiment, 22 nm Si measurements for 50,000 bits show that prior to burn-in, ~13% of the bits are masked off as dark bits for a window width of 100. Burn-in stabilizes a portion of the dark bits, reducing the total dark bit count to ~11%. These bits will be forced to '0' or '1', based on spatial location (even or odd). The use of soft dark bits with a window of 100 reduces unstability by 13% and bit error percentage from 4.2%, down to 0.97% (approximately 22% reduction). Dark bits can also be used to catch bits that change value with voltage and temperature variations.

The embodiments describe herein may provide a simple and effective method to reduce PUF error rate without additional fuse overhead. As described herein, the embodiments use the least amount of fuses in order to extract a 256-bit key from PUF, as compared to other approaches.

FIG. 6A is a block diagram illustrating a micro-architecture for a processor 600 that implements dynamic heterogeneous hashing according to one embodiment. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multiprocessor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processing device 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
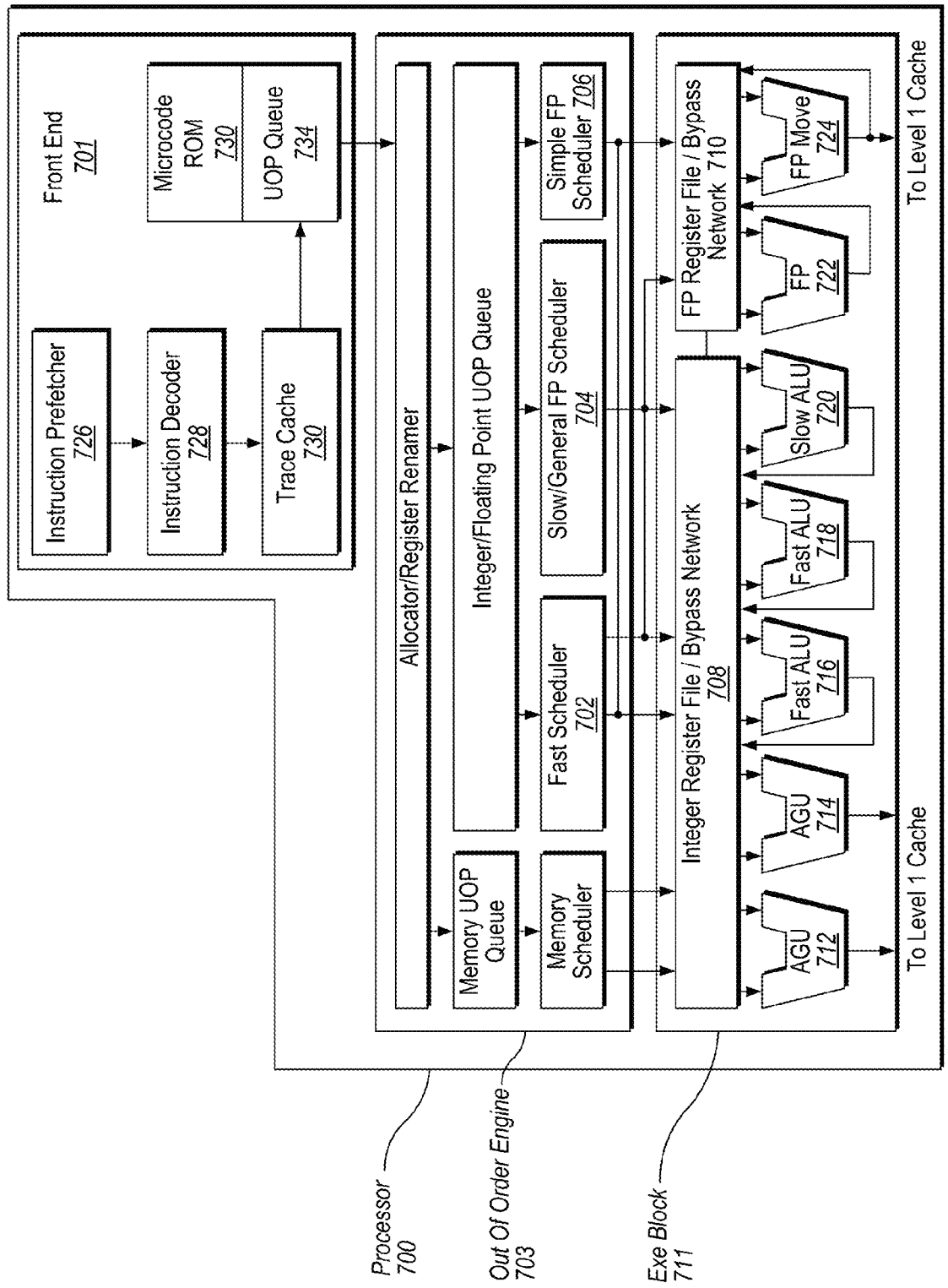
FIG. 7 illustrates a block diagram of the micro-architecture for a processor that includes logic circuits to perform dynamic heterogeneous hashing according to one embodiment.

FIG. 7 illustrates a block diagram of the micro-architecture for a processor 700 that includes logic circuits to perform dynamic heterogeneous hashing according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement dynamic heterogeneous hashing according to one embodiment. In one embodiment, the execution block 711 of processor 700 may include MCU 115, to perform dynamic heterogeneous hashing according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
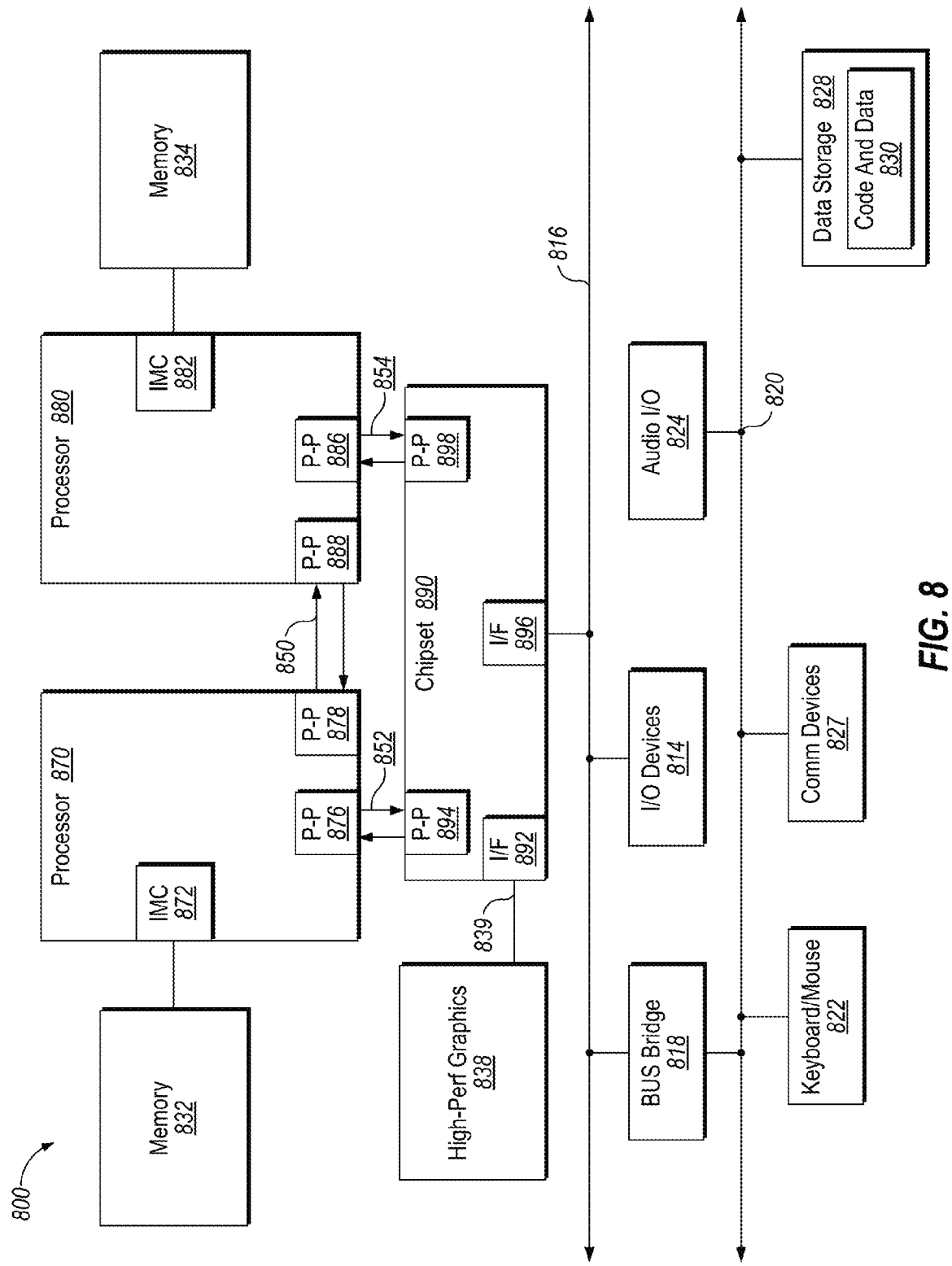
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. The processors each may include hybrid write mode logics in accordance with an embodiment of the present.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
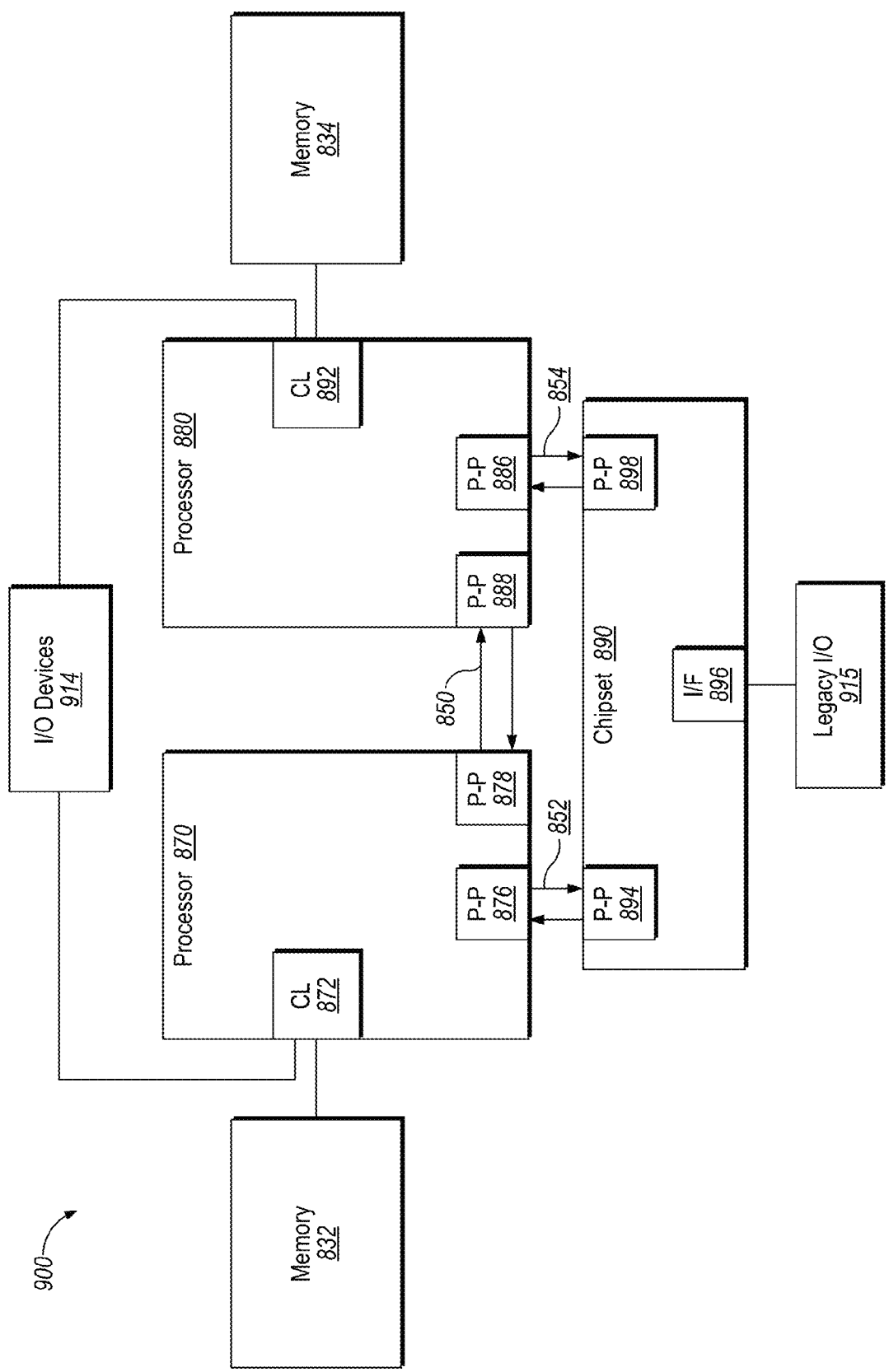
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990.

Figure 10:
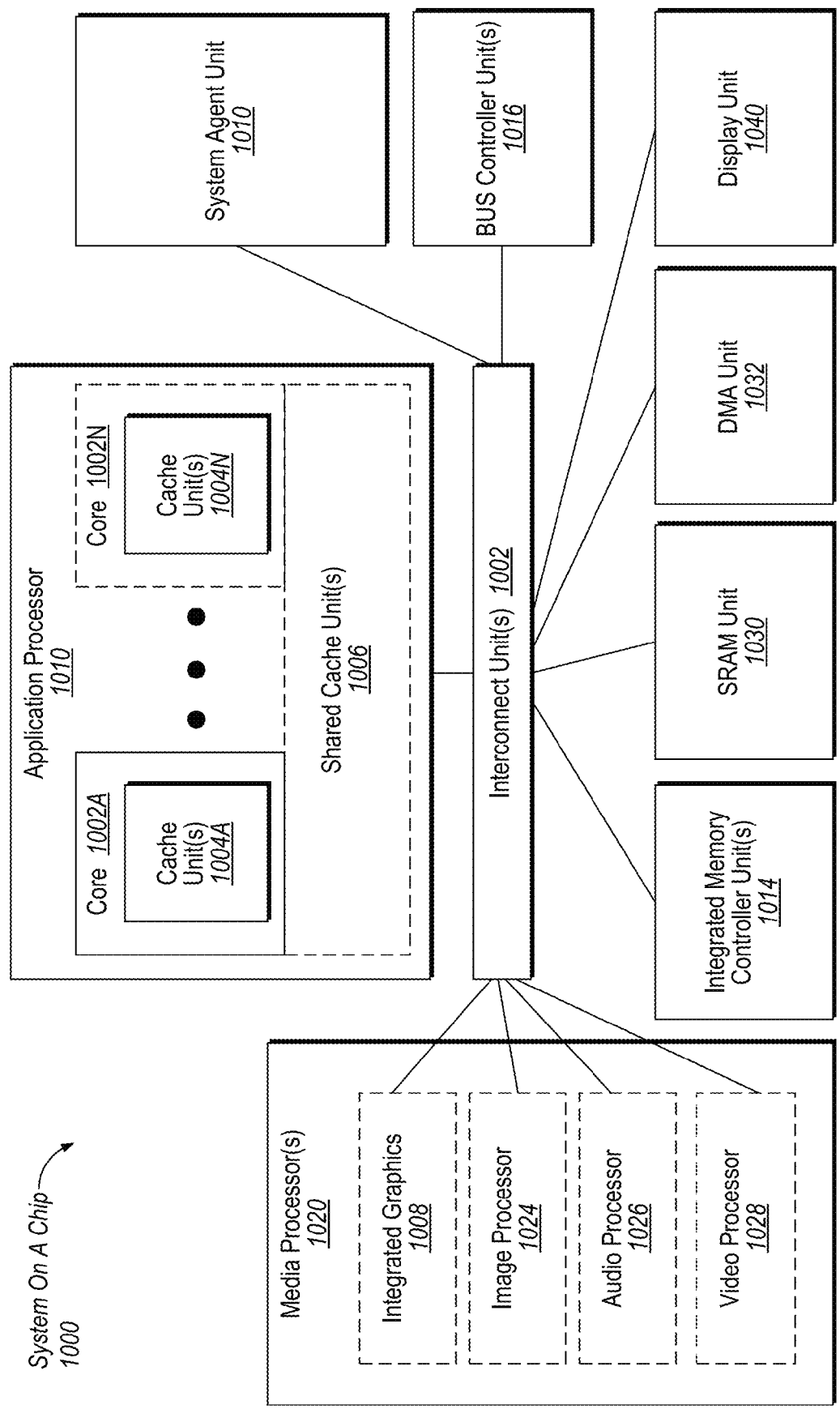
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
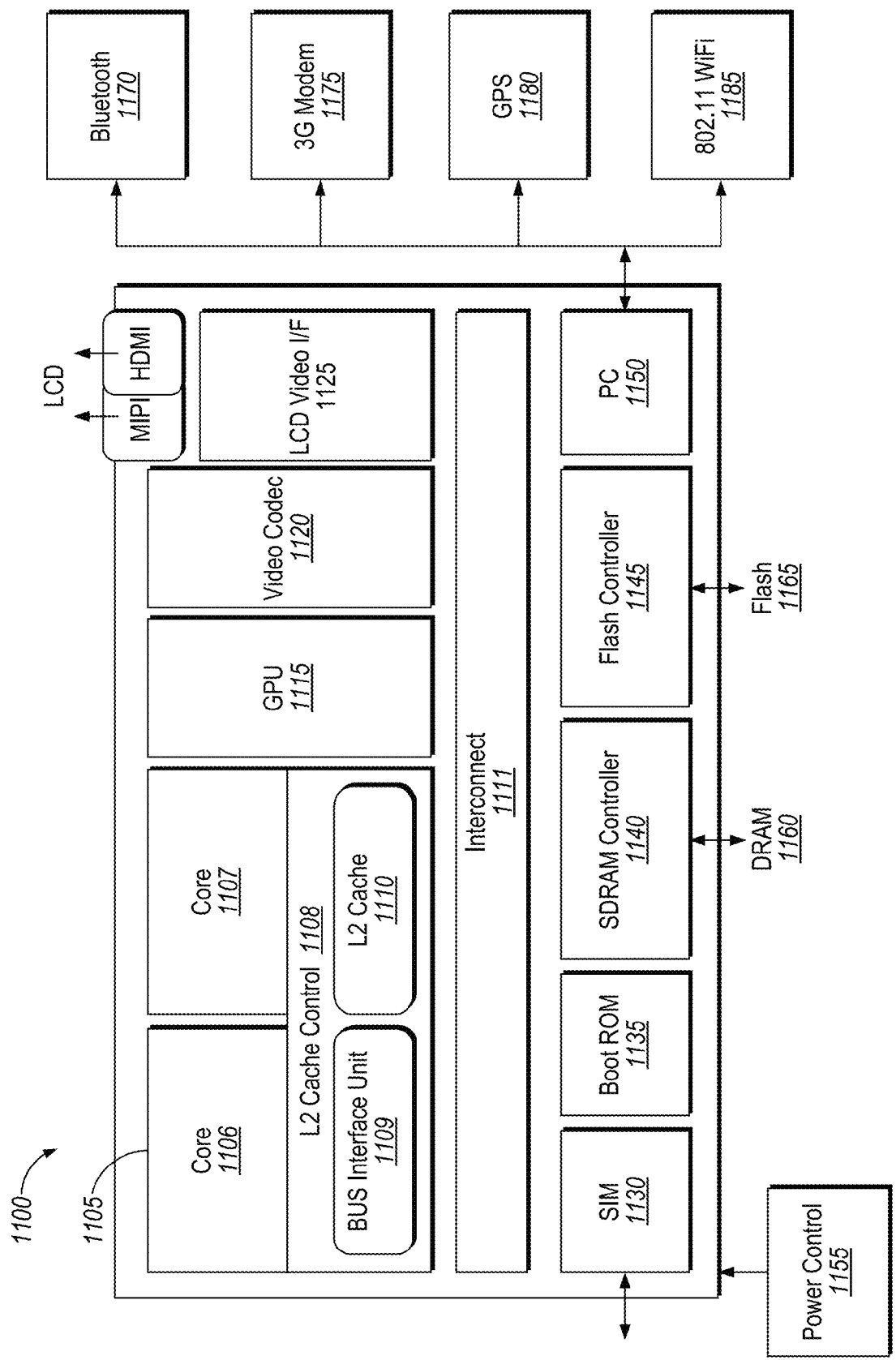
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
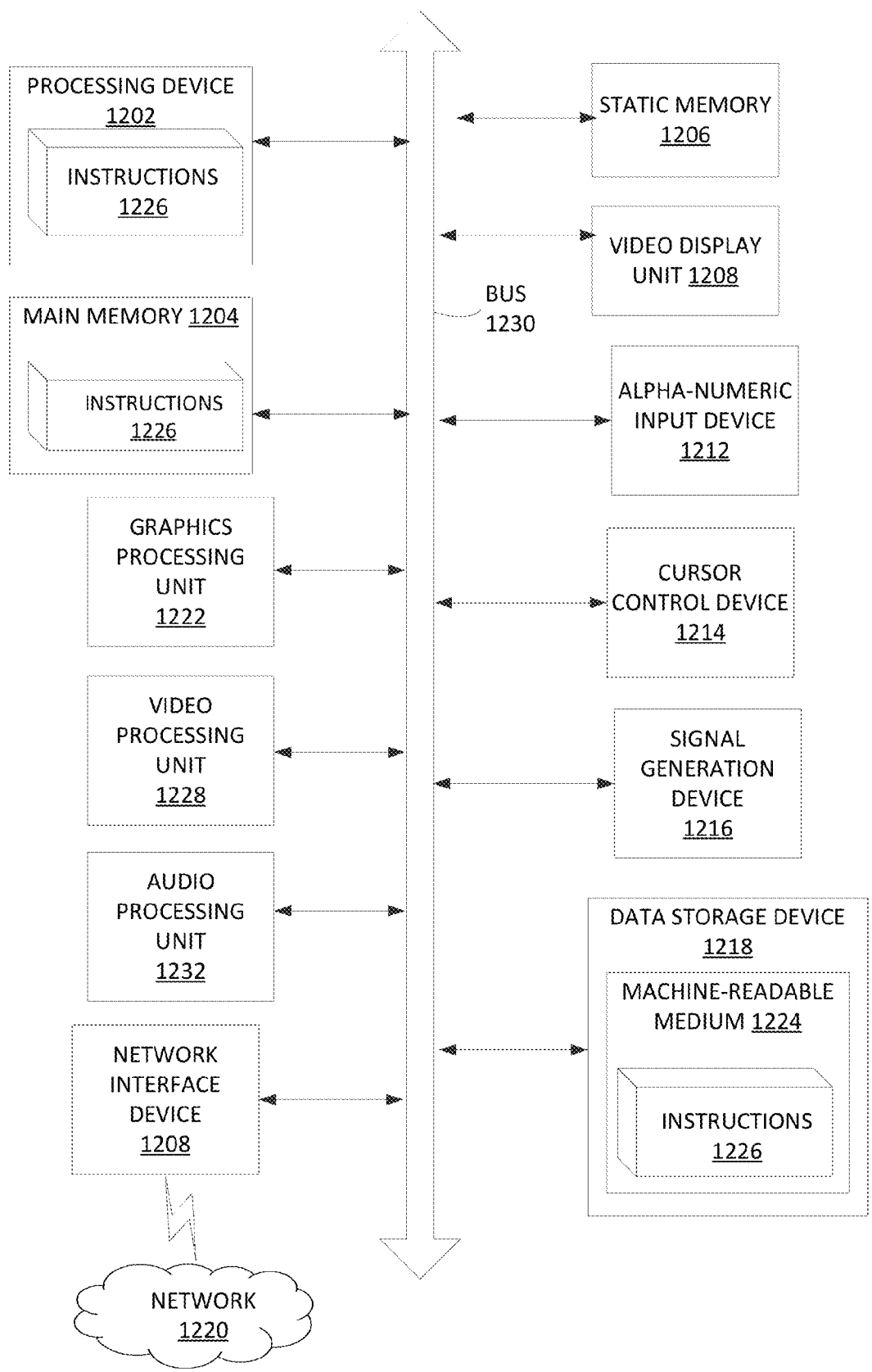
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 13:
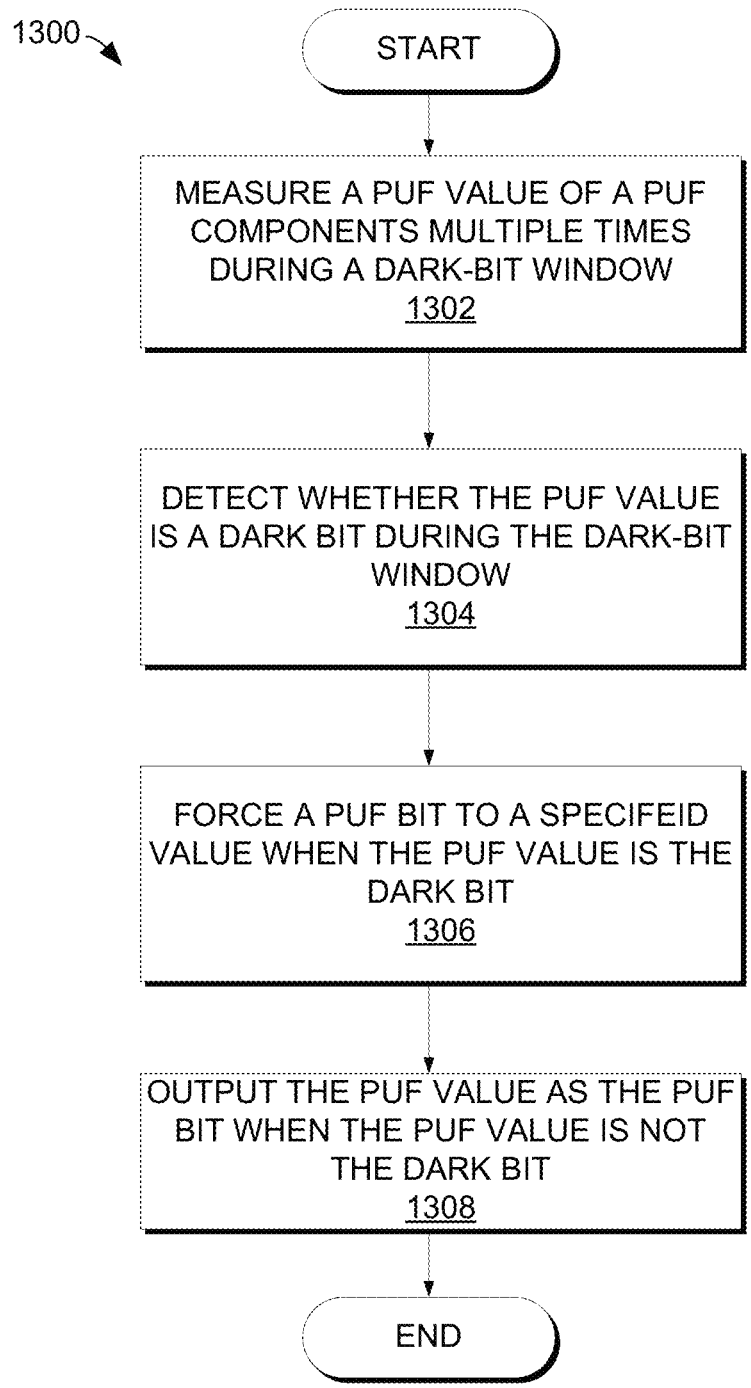
FIG. 13 is a flow diagram of a method of setting a PUF bit to be a specified value when it is a dark bit according to one embodiment.

FIG. 13 is a flow diagram of a method 1300 of forcing a PUF bit to a specified value when it is a dark bit according to one embodiment. Method 1300 may be performed by processing logic that may comprise hardware (e.g., circuitry, dedicated logic, programmable logic, microcode, etc.), software (such as operations being performed by the MCU), firmware or a combination thereof. In one embodiment, method 1300 is performed by dark-bit masking block 134 of FIG. 1. In another embodiment, the method 1300 is performed by the processor 102 of FIG. 1 or secure key manager 130 of FIG. 1. Alternatively, other components of the computing system 100 may perform some or all of the operations of the method 1300.

Referring to FIG. 13, the method 1300 begins by the processing logic (e.g., dark-bit masking logic) with measuring a PUF value of a PUF component of a processor multiple times during a dark-bit window (block 1302). The processing logic detects whether the PUF value is a dark bit during the dark-bit window (block 1304). The dark bit indicates that the PUF value is unstable during the dark-bit window. The processing logic forces a PUF bit of the PUF component to a specified value (i.e., sets the PUF bit to be the specified value) when the PUF value is the dark bit (block 1306). The processing logic outputs the PUF value as the PUF bit when the PUF value is not the dark bit (block 1308), and the method 1300 ends.

In another embodiment, the processing logic at block 1302 measures an output of a cross-coupled inverter pair. In another embodiment, the processing logic at block 1304 detects a transition in the PUF value during the dark-bit window and gates a clock signal to the PUF component in response to the detecting the transition. In another embodiment, the processing logic at block 1304 stores the PUF value in a master latch coupled to the PUF component, the master latch to output a first output and stores an output of the master latch using a slave latch coupled to the master latch, the slave latch to output a second output. The processing logic detects a difference between the first output and the second output. In a further embodiment, the processing logic resets the dark-bit window by a reset signal.

As described herein, the dark-bit masking logic can be implemented as circuitry. In another embodiment, the dark-bit masking logic can be implemented by a processing core of the processor, such as microcode, firmware, software, or the like.

The following examples pertain to further embodiments.

Example 1 is a processor comprising: 1) a processor core and 2) a secure key manager component that is coupled to the processor core. The secure key manager comprises a) a PUF component and b) a dark-bit masking circuit coupled to the PUF component. The dark-bit masking circuit is to measure a PUF value of the PUF component multiple times during a dark-bit window to detect whether the PUF value of the PUF component is a dark bit. The dark bit indicates that the PUF value of the PUF component is unstable during the dark-bit window. The dark-bit masking circuit is also to output the PUF value as an output PUF bit of the PUF component when the PUF value is not the dark bit and set the output PUF bit to be a specified value when the PUF value of the PUF component is the dark bit.

In Example 2, the PUF component of Example 1 comprises a cross-coupled inverter pair to output the PUF value In Example 3, the dark-bit masking circuit of any one of Examples 1-2, bit-transition logic to detect a transition in the PUF value during the dark-bit window and to output a dark signal in response to the detected transition, and clock-gating logic to gate a clock signal to the PUF component in response to the dark signal.

In Example 4, the dark-bit masking circuit of any one of Examples 1-3, comprises a master latch coupled to an output of the PUF component, a slave latch coupled to the output of the master latch, and an XOR gate coupled to receive an output of the master latch and an output of the slave latch.

In Example 5, the dark-bit masking circuit of any one of Examples 1-4, comprises an AND gate coupled to receive an output of the XOR gate, and a first NOR gate coupled to receive an output of the AND gate and the output of the slave latch.

In Example 6, the dark-bit masking circuit of any of Examples 1-5, comprises a second NOR gate coupled to receive an output of the AND gate and a clock signal and a third NOR gate coupled to receive the output of the AND gate and the clock signal.

In Example 7, the dark-bit masking circuit of any of Examples 1-6, comprises a first NAND gate coupled to receive an output of the XOR gate, and a second NAND gate coupled to receive an output of the first AND gate and the output of the slave latch.

In Example 8, the dark-bit masking circuit of any of Examples 1-7, comprises a third NAND gate coupled to receive an output of the first AND gate and a clock signal, and a fourth NAND gate coupled to receive the output of the first AND gate and the clock signal, wherein the PUF component comprises a cross-coupled inverter pair coupled to receive an output of the third NAND gate and an output of the fourth NAND gate.

Various embodiments may have different combinations of the structural features described above. For instance, all optional features of the computing system described above may also be implemented with respect to the method or process described herein and specifics in the examples may be used anywhere in one or more embodiments.

In Example 9, a method comprises 1) measuring, by dark-bit masking logic, a physically unclonable function (PUF) value of a PUF component of a processor multiple times during a dark-bit window; 2) detecting, by the dark-bit masking logic, whether the PUF value is a dark bit during the dark-bit window, wherein the dark bit indicates that the PUF value is unstable during the dark-bit window; 3) forcing, by the dark-bit masking logic, a PUF bit of the PUF component to a specified value when the PUF value is the dark bit; and 4) outputting, by the dark-bit masking logic, the PUF value as the PUF bit when the PUF value is not the dark bit.

In Example 10, in the method of Example 9, the measuring the PUF value comprises measuring, by the dark-bit masking logic, an output of a cross-coupled inverter pair.

In Example 11, in the method of any of Examples 9-10, the detecting whether the PUF value is the dark bit comprises: a) detecting, by dark-bit masking logic, a transition in the PUF value during the dark-bit window; and b) gating, by the dark-bit masking logic, a clock signal to the PUF component in response to the detecting the transition.

In Example 12, in the method of any of Examples 9-11, the detecting whether the PUF value is the dark bit comprises: a) storing the PUF value in a master latch coupled to the PUF component, the master latch to output a first output; b) storing an output of the master latch using a slave latch coupled to the master latch, the slave latch to output a second output; and c) detecting a difference between the first output and the second output.

In Example 13, the method of any of Examples 9-12, further comprising resetting the dark-bit window by the dark-bit masking logic.

In Example 14, in the method of any of Examples 9-13, the dark-bit masking logic comprises logic circuitry.

In Example 15, in the method of any of Examples 9-14, the dark-bit masking logic is executed by a processing core of the processor.

Example 16 is an integrated circuit comprising 1) a processor core; 2) a plurality of PUF components to generate a hardware key, each of the plurality of PUF components outputting a PUF bit of the hardware key; and 3) a dark-bit masking circuit coupled to the plurality of PUF components, wherein the dark-bit masking circuit is to determine unstable bits in the PUF bits of the hardware key and to set the unstable bits to be specified values.

In Example 17, the dark-bit masking circuit of Example 16, comprises bit-transition logic to detect a transition in the PUF value during the dark-bit window and to output a dark signal in response to the detected transition, and clock-gating logic to gate a clock signal to the PUF component in response to the dark signal.

In Example 18, the PUF component of any of Examples 16-17, comprises a cross-coupled inverter pair, and wherein the dark-bit masking circuit comprises: a master latch coupled to an output of the PUF component; a slave latch coupled to the output of the master latch; and an exclusive-OR (XOR) gate coupled to receive an output of the master latch and an output of the slave latch.

In Example 19, the dark-bit masking circuit of any of Examples 16-18, comprises: an AND gate coupled to receive an output of the XOR gate; and a first NOR gate coupled to receive an output of the AND gate and the output of the slave latch.

In Example 20, the dark-bit masking circuit of any of Examples 16-19, comprises: a second NOR gate coupled to receive an output of the AND gate and a clock signal; and a third NOR gate coupled to receive the output of the AND gate and the clock signal, wherein the PUF component comprises a cross-coupled inverter pair coupled to receive an output of the second NOR gate and an output of the third NOR gate.

In Example 21, the dark-bit masking circuit of any of Examples 16-20, comprises: a first NAND gate coupled to receive an output of the XOR gate; and a second NAND gate coupled to receive an output of the first AND gate and the output of the slave latch.

In Example 22, the dark-bit masking circuit of any of Examples 16-21, comprises: a third NAND gate coupled to receive an output of the first AND gate and a clock signal; and a fourth NAND gate coupled to receive the output of the first AND gate and the clock signal, wherein the PUF component comprises a cross-coupled inverter pair coupled to receive an output of the third NAND gate and an output of the fourth NAND gate Various embodiments may have different combinations of the operational features described above. For instance, all optional features of the method described above may also be implemented with respect to a non-transitory, computer-readable storage medium. Specifics in the examples may be used anywhere in one or more embodiments.

Example 23 is a non-transitory, computer-readable storage medium including instructions that, when executed by a processor, cause the processor to perform the method of Examples 9-15.

Example 24 is a system on chip (SoC) comprising a plurality of functional units and a secure key manager coupled to the plurality of functional units, wherein the secure key manager comprises a PUF component and a dark-bit masking block, wherein the dark-bit masking block is to determine unstable bits in the PUF bits of the hardware key and to set the unstable bits to be specified values.

In Example 25, the SoC of Example 24 further comprises the subject matter of Examples 1-8 and 16-22.

In Example 26, the SoC of Example 24 is further configured to perform the subject matter of Examples 9-15.

Example 27 is an apparatus comprising: 1) means for measuring, by dark-bit masking logic, a physically unclonable function (PUF) value of a PUF component of a processor multiple times during a dark-bit window; 2) means for detecting, by the dark-bit masking logic, whether the PUF value is a dark bit during the dark-bit window, wherein the dark bit indicates that the PUF value is unstable during the dark-bit window; 3) means for forcing, by the dark-bit masking logic, a PUF bit of the PUF component to a specified value when the PUF value is the dark bit; and 4) means for outputting, by the dark-bit masking logic, the PUF value as the PUF bit when the PUF value is not the dark bit.

In Example 28, the apparatus of Example 27 further comprises subject matter of Examples 1-8 and 16-222.

Example 29 is a system comprising: a memory device and a processor comprising a dark-bit masking block, wherein the processor is configured to perform the method of any of Examples 9-15.

In Example 30, the system of Example 29 further comprises the subject matter of any of Examples 1-8 and 16-22.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to dynamic heterogeneous hashing in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a processor core; and
   a secure key manager component coupled to the processor core, wherein the secure key manager comprises:
      a physically unclonable function (PUF) component; and
      a dark-bit masking circuit, coupled to the PUF component, wherein the dark-bit masking circuit is to:
         measure a PUF value of the PUF component multiple times during a dark-bit window to detect whether the PUF value of the PUF component is a dark bit, wherein the dark bit indicates that the PUF value of the PUF component is unstable during the dark-bit window;
         output the PUF value as an output PUF bit of the PUF component when the PUF value is not the dark bit; and
         set the output PUF bit to be a specified value when the PUF value of the PUF component is the dark bit.

2. The processor of claim 1, wherein the PUF component comprises a cross-coupled inverter pair to output the PUF value.

3. The processor of claim 1, wherein the dark-bit masking circuit comprises:
   bit-transition logic to detect a transition in the PUF value during the dark-bit window and to output a dark signal in response to the detected transition; and
   clock-gating logic to gate a clock signal to the PUF component in response to the dark signal.

4. The processor of claim 1, wherein the dark-bit masking circuit comprises:
   a master latch coupled to an output of the PUF component;
   a slave latch coupled to the output of the master latch; and
   an exclusive-OR (XOR) gate coupled to receive an output of the master latch and an output of the slave latch.

5. The processor of claim 4, wherein the dark-bit masking circuit further comprises:
   an AND gate coupled to receive an output of the XOR gate; and a first NOR gate coupled to receive an output of the AND gate and the output of the slave latch.

6. The processor of claim 5, wherein the dark-bit masking circuit further comprises:
a second NOR gate coupled to receive an output of the AND gate and a clock signal; and
a third NOR gate coupled to receive the output of the AND gate and the clock signal, wherein the PUF component comprises a cross-coupled inverter pair coupled to receive an output of the second NOR gate and an output of the third NOR gate.

7. The processor of claim 4, wherein the dark-bit masking circuit further comprises:
a first NAND gate coupled to receive an output of the XOR gate; and
a second NAND gate coupled to receive an output of the first AND gate and the output of the slave latch.

8. The processor of claim 7, wherein the dark-bit masking circuit further comprises:
a third NAND gate coupled to receive an output of the first AND gate and a clock signal; and
a fourth NAND gate coupled to receive the output of the first AND gate and the clock signal, wherein the PUF component comprises a cross-coupled inverter pair coupled to receive an output of the third NAND gate and an output of the fourth NAND gate.

9. A method comprising:
measuring, by dark-bit masking logic, a physically unclonable function (PUF) value of a PUF component of a processor multiple times during a dark-bit window;
detecting, by the dark-bit masking logic, whether the PUF value is a dark bit during the dark-bit window, wherein the dark bit indicates that the PUF value is unstable during the dark-bit window; and
setting, by the dark-bit masking logic, a PUF bit of the PUF component to be a specified value when the PUF value is the dark bit; and
outputting, by the dark-bit masking logic, the PUF value as the PUF bit when the PUF value is not the dark bit.

10. The method of claim 9, wherein the measuring the PUF value comprises measuring, by the dark-bit masking logic, an output of a cross-coupled inverter pair.

11. The method of claim 9, wherein the detecting whether the PUF value is the dark bit comprises:
detecting, by dark-bit masking logic, a transition in the PUF value during the dark-bit window; and
gating, by the dark-bit masking logic, a clock signal to the PUF component in response to the detecting the transition.

12. The method of claim 9, wherein the detecting whether the PUF value is the dark bit comprises:
storing the PUF value in a master latch coupled to the PUF component, the master latch to output a first output;
storing an output of the master latch using a slave latch coupled to the master latch, the slave latch to output a second output; and
detecting a difference between the first output and the second output.

13. The method of claim 12, further comprising resetting the dark-bit window by the dark-bit masking logic.

14. The method of claim 12, wherein the dark-bit masking logic comprises logic circuitry.

15. The method of claim 12, wherein the dark-bit masking logic is executed by a processing core of the processor.

16. An integrated circuit comprising:
a processor core;
a plurality of physically unclonable function (PUF) components to generate a hardware key, wherein each of the PUF components output a PUF bit of the hardware key; and
a dark-bit masking circuit coupled to the plurality of PUF components, wherein the dark-bit masking circuit is to determine unstable bits in the PUF bits of the hardware key and to set the unstable bits to be specified values.

17. The integrated circuit of claim 16, wherein the PUF component comprises a cross-coupled inverter pair, and wherein the dark-bit masking circuit comprises:
bit-transition logic to detect a transition in the PUF value during a dark-bit window and to output a dark signal in response to the detected transition; and
clock-gating logic to gate a clock signal to the PUF component in response to the dark signal.

18. The integrated circuit of claim 16, wherein the PUF component comprises a cross-coupled inverter pair, and wherein the dark-bit masking circuit comprises:
a master latch coupled to an output of the PUF component;
a slave latch coupled to the output of the master latch; and
an exclusive-OR (XOR) gate coupled to receive an output of the master latch and an output of the slave latch.

19. The integrated circuit of claim 18, wherein the dark-bit masking circuit further comprises:
an AND gate coupled to receive an output of the XOR gate; and
a first NOR gate coupled to receive an output of the AND gate and the output of the slave latch.

20. The integrated circuit of claim 19, wherein the dark-bit masking circuit further comprises:
a second NOR gate coupled to receive an output of the AND gate and a clock signal; and
a third NOR gate coupled to receive the output of the AND gate and the clock signal, wherein the PUF component comprises a cross-coupled inverter pair coupled to receive an output of the second NOR gate and an output of the third NOR gate.

21. The integrated circuit of claim 18, wherein the dark-bit masking circuit further comprises:
a first NAND gate coupled to receive an output of the XOR gate; and
a second NAND gate coupled to receive an output of the first AND gate and the output of the slave latch.

22. The integrated circuit of claim 21, wherein the dark-bit masking circuit further comprises:
a third NAND gate coupled to receive an output of the first AND gate and a clock signal; and
a fourth NAND gate coupled to receive the output of the first AND gate and the clock signal, wherein the PUF component comprises a cross-coupled inverter pair coupled to receive an output of the third NAND gate and an output of the fourth NAND gate.

* * * * *